Patented Feb. 12, 1946

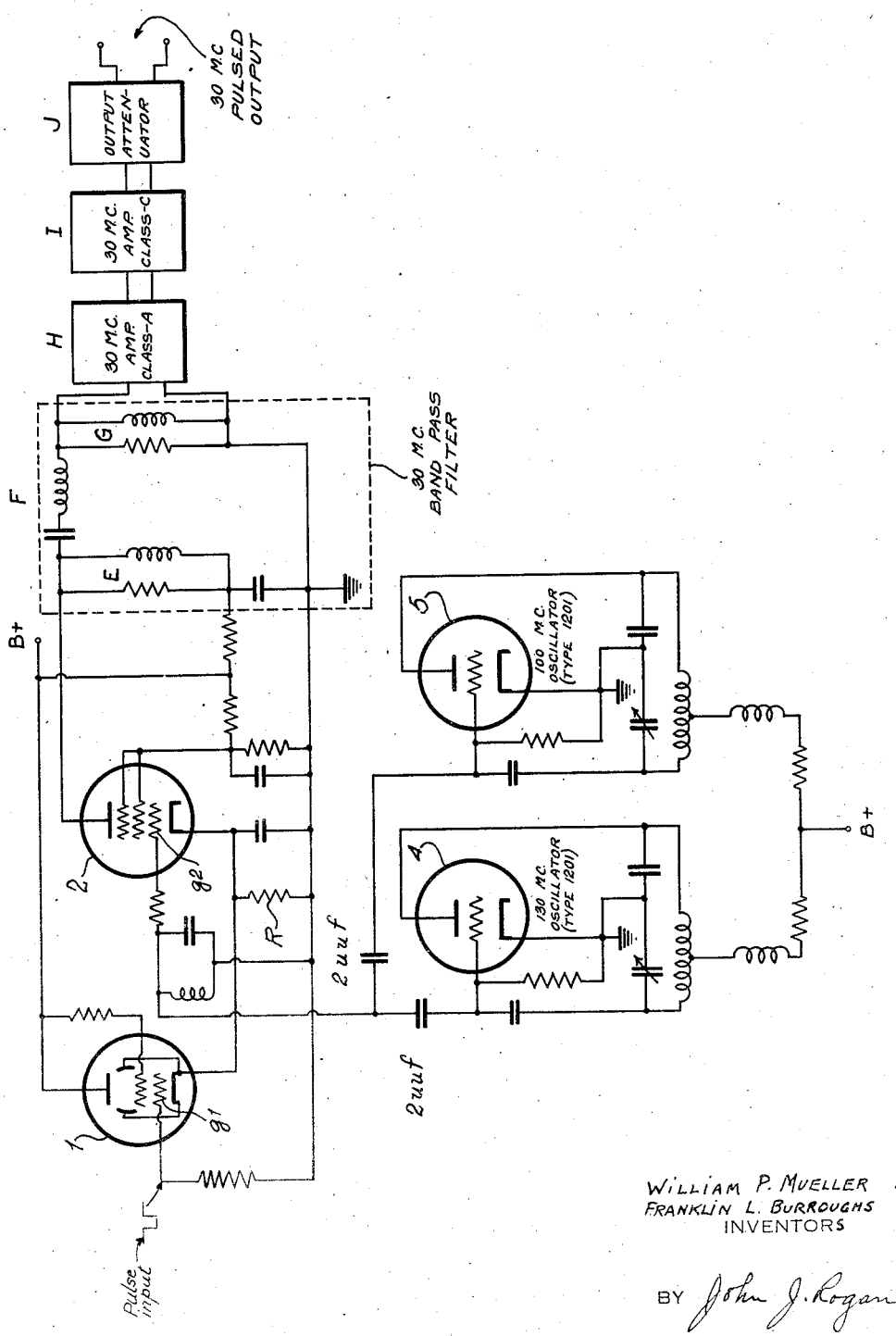

2,394,933

UNITED STATES PATENT OFFICE 2,394,933

RADIO TRANSMISSION AND TESTING SYSTEM UTILIZING PULSE TYPE GENERATORS

William P. Mueller and Franklin L. Burroughs, Emporium, Pa., assignors to Sylvania Electric Products Inc., Emporium, Pa., a corporation of Massachusetts Application October 30, 1943, Serial No. 508,340

6 Claims. (Cl. 179—171)

This invention relates to pulse type signal generators and especially to generators which are free from self-generation of inter-pulse disturbances. This invention is particularly useful in signal generators as used for measuring the sensitivity of radio receivers and for determining the response of a receiver, in particular of a receiver with wide radio frequency pass band. It will be understood however that such preferred use is merely illustrative and is disclosed not by way of limitation.

The usual procedure of measuring the response of a wide band amplifier radio frequency receiver consists in making a large number of measurements of the receiver response to different continuously running fixed frequency signals within the pass band. In measuring the sensitivity of the receiver, the output of the signal generator producing the signal frequency must be highly attenuated, and special means must be provided for reducing the stray field amplitude at the receiver input to a value below that of the attenuated signal fed to the receiver input.

This procedure is very tedious and ties up the signal generator and testing operator for a long time. It has therefore been suggested to replace this method of measuring by a method using a single measurement, by taking advantage of the Fourier spectrum into which short pulses of interrupted continuous waves of a single fixed frequency can be resolved. This method is also particularly useful for determining the response of receivers which are specially designed to faithfully reproduce the shape of pulsed signals. The shape of the pulse reproduced by the receiver in response to a pulsed incoming high frequency signal can be observed on the screen of an oscillograph. This shape will be considerably distorted if the pass band of the receiver is too narrow.

In building a pulsed signal generator according to this outline, a number of difficulties present themselves. One may consider two ways of carrying out the design: Either to key the output of a continuously running oscillator tuned to the center frequency of the wide band receiver, or to key the oscillator tube itself. Both methods are not satisfactory, as will be understood from the following consideration.

In order to determine sensitivity, the output of the signal generator must be highly attenuated, sometimes to the order of 120 db. If the output of a continuously running constant frequency generator is pulsed, it frequently happens that the stray field of the continuously running generator tank circuit continuously feeds a higher amplitude to the receiver input than the signal fed to it over the attenuator during the impulses. A measurement of the receiver sensitivity from the setting of the attenuator then becomes impossible, or meaningless and may lead to considerable errors. The stray field may be reduced, to a certain extent, by screening, but it is, of course, much more desirable to go to the root of this trouble by generating the fixed H. F. signal only during the pulses. This may be done, as mentioned above, by keying the oscillator tube feeding an associated tank circuit. To insure frequency stability, the tank circuit worked by the oscillator tube must have a high Q. Accordingly, the output of this tube cannot give a sharp rectangular H. F. pulse, in response to a rectangular keying pulse as high damping is needed in the tank circuit for a quick response to keying. It takes time before the high Q circuit comes up to standard amplitude, and at the end of the pulse its oscillation will die out slowly. Low Q tank circuits, which would have the desired rapid response, are excluded from the point of view of frequency stability and for other reasons.

Accordingly, it is an object of the invention to provide a pulsed signal generator which produces no continuous stray field of the output carrier frequency.

It is another object of the invention to provide means for keying a H. F. signal generator capable of producing an output signal rising up to and falling off maximum amplitude within a few cycles of a desired H. F. carrier frequency.

A still further object of the invention refers to a pulsed H. F. signal generator incorporating continuously running H. F. tank circuits which produce no stray field of a frequency within the measuring frequency band.

It is still another object of the invention to provide a H. F. generator incorporating two continuously running H. F. tank circuits, whose frequencies are far removed from the pass band to be measured by the signal generator.

According to another principal object of the invention, means are provided to produce a sharply pulsed H. F. output signal of a desired frequency by keying the control grid of a tube to which are fed two signals of different frequencies.

According to a feature of the invention, the signals from two continuously running H. F. oscillators of different frequencies are heterodyned by a converter tube whose grid is normally biassed to cut-off and periodically provided with sharp rectangular voltage pulses.

According to another feature of the invention, the output signal from the pulsed mixer tube is amplified by two stages in cascade, the first stage being a class A stage, the second a class C stage.

One feature of the invention refers to means for preventing the incidental heterodyning of stray fields of two frequencies generated by two continuously running generators in one of the amplifying stages following the proper converter stage.

The invention will now be described in connection with the drawing.

For the purpose of clearness, let us assume that it is desired to build a pulsed signal generator capable of determining the response of a receiver with wide band radio frequency stage around a center frequency of 30 mc. with a pass band from 26 to 34 mc. The pulsed generator, in this case, will then consist of two continuously running oscillation circuits, tuned to two different frequencies, say 100 mc. and 130 mc. respectively, including tubes 4 and 5. The oscillation circuits may be of any conventional type or such as indicated in the drawing, but they do not constitute features of the invention. The two frequencies are fed additively to grid $g_2$ of tube 2 which may be a type 7V7 which is normally biassed below cut-off due to the normal plate current of tube 1 flowing through resistance R. The cathode of tube 2 is also tied directly to the cathode of keyer tube 1 which may be a type 7C5. Tube 2 is biassed by tube 1 so that no 30 mc. signal is produced by the converter.

Suitable sharp rectangular negative voltage pulses are fed at periodic intervals to the grid of tube 1, cutting it off and allowing the converter tube 2 to operate for the duration of the pulse. The 50 mmf. condenser in the cathode return of tube 2 provides a low impedance path for 30 mc. but is not large enough to distort the keying pulse shape. In the plate circuit of tube 2 a band pass filter EFG is tuned to the difference frequency of 30 mc. and so that it is provided with a center frequency of 30 mc. and whose band width is properly chosen for passing a considerable band, say from about 25 to about 35 mc. The filter is so designed, that it swings up to maximum response (in less than one cycle of the frequencies band). For example with a rise and fall to 90% full amplitude the time is of the order of 0.1 micro-second.

The output of this plate circuit is fed to a wide band amplifier H. The pass band of this amplifier is similar to that of filter EFG. Amplifier H is biassed as class A amplifier so as to reduce the possibility of converting any continuous stray field of frequencies 100 mc. and 130 mc. which may incidentally be present at its input, resulting in the presence of a continuous beat frequency of 30 mc. at this stage. Amplifier I is biassed to class C operation or beyond cut-off. Any heterodyning of stray fields of 100 mc. and 130 mc. in this last stage will not be detrimental because the grid bias of the amplifier tube I can be chosen large compared with the small stray field amplitude. The output of amplifier I is finally fed to adjustable attenuator J, which regulates the measured input into the receiver to be tested, as usual.

The advantages of this arrangement are twofold: In the first place, the carrier frequency of the pulsed H. F. signal (30 mc. in the example) is not generated continuously. The mixing of the two component frequencies (100 mc. and 130 mc.) takes place only during the period of the keying pulses. There can therefore be no continuous stray field of the center frequency of the wide band amplifier during the periods between impulses. Class A amplification of the mixer output reduces the heterodyning of the stray fields of the component frequencies (100 mc. and 130 mc.) in this amplification stage. Should any of the 100 or 130 mc. energy be conveyed to the grid of stage H, by reason of the interelectrode tube capacities of the converter tube, mixing might occur in this stage with resulting continuous 30 mc. output. For this reason this stage is biassed class A to give poor conversion. Whatever heterodyning may be present in the output of the class A amplifier will be very weak and easy to shield. The method of heterodyning applied to a pulsed signal generator eliminates therefore most of the shielding difficulties that would be encountered in a signal generator incorporating a continuously running 30 mc. oscillation circuit, with pulsed output, and eliminates any 30 mc. output between pulse intervals.

It is of course understood, that the absolute values of the frequencies in the example described in connection with the drawing were chosen merely for illustration, and that the invention is in no way limited to this frequency range. The relevant feature is that the frequencies of the continuously running oscillators of the pulsed generator are far enough removed from the radio frequency band of the receiver whose response is to be measured, and that further means are provided which reduce the heterodyning of the stray fields of the continuously running oscillators in a subsequent amplification stage to an irrelevant amplitude.

While in the foregoing the invention is disclosed as a pulse generator for testing amplifiers it will be apparent that the output of devices I or J can be used for transmission in any known type of pulse transmission or converting system.

What is claimed is:

1. In a pulse type radio system, a pair of local sustained wave oscillators, a keyer tube arranged to have its plate current interrupted in synchronism with impressed square top pulses, a converter tube having its control grid connected to the tank circuit of said oscillators said control grid being biassed to plate current cut-off under control of the plate current of said keyer tube, a filter arrangement having a mid-frequency corresponding to the desired beat between said oscillators, a class A amplifier tuned to said beat, a class C amplifier connected to said class A amplifier and also tuned to said beat, and a load device energized only by said amplified beat and substantially entirely isolated from the stray energy from said oscillators.

2. In combination a grid-controlled keyer tube arranged to have its control grid excited by square top waves in the form of pulses, a grid-controlled converter tube having its control grid biassed to plate current cut-off under control of the plate current of said keyer tube in the intervals between said pulses, a high frequency tank circuit arrangement also connected to the control grid of said converter tube said tank circuit arrangement carrying two different high frequency sustained waves, a filter connected to output of said converter and tuned to one of the beats between said sustained waves, an attenuator connected to said filter for attenuating the signals in the output to a level commensurate with the stray radiation from said tank circuit arrangement, and a class A amplifier tuned to said beat connected between said filter and said attenuator whereby stray fields from said tank circuit arrangement are substantially isolated from the output of said attenuator.

3. A pulsed signal generator for radio measuring systems and the like comprising a continuously running high frequency tank circuit arrangement carrying a plurality of high frequency sustained waves, a frequency converter connected to said arrangement, means to pulse the output of said converter at a predetermined frequency under control of square topped pulses and including a grid-controlled keyer tube whose plate current controls the cut-off bias of said converter tube, a selective network connected to said converter for selecting one of the beats between said plurality of sustained waves, a class A amplifier connected to said network, a class C amplifier connected to said class A amplifier, and an attenuator connected to said class C amplifier.

4. In a system for testing devices such as sensitive radio receivers and using a sustained high frequency oscillator for generating the testing energy and an attenuator for reducing the testing energy to a level commensurate with the stray energy from said oscillator, means to effectively isolate the tank circuit of said oscillator from the input to the device under test, comprising a grid-controlled converter tube having its control grid excited from said tank circuit and biassed to plate current cut-off at spaced intervals, a grid-controlled keyer tube for controlling said bias, a selective network connected to the output of said converter for selecting energy of a frequency different from the frequency of said oscillator, and an amplifier tube connected between said network and said attenuator and biassed for class A operation whereby stray energy from the tank circuit of said oscillator is effectively isolated from the output of said attenuator.

5. In a system for transmitting pulse-controlled carrier signals of carrier frequency F, means to generate continuously sustained oscillations of frequency $F_1$, means to generate other continuously sustained oscillations of frequency $F_2$, a converter tube upon which said frequencies are simultaneously impressed to produce said carrier frequency F, means normally biassing said converter tube to plate current cut off in the absence of pulse signals, means to apply pulse signals to key said converter tube to cause it to pass plate current, means to select from said converter the frequency F, means to amplify the selected frequency F, and means to adjust the bias on said amplifier to substantially eliminate therein any heterodyning action with stray fields originating from said sustained oscillations of frequencies $F_1$ and $F_2$.

6. The method of testing wide band radio frequency amplifiers such as those used for amplification of square-topped pulses of carrier frequency F which comprises, generating two sustained high frequency waves of carrier frequency $F_1$, $F_2$, combining said waves in a converter to convert them into a frequency F, keying the converter by square-topped controlled pulses, blocking the converter in the intervals between said control pulses, and amplifying only said converted frequency F in an amplifier having substantially zero conversion gain for stray energy from said two generated frequencies $F_1$ and $F_2$.

WILLIAM P. MUELLER.
FRANKLIN L. BURROUGHS.